United States Patent [19]

Bock et al.

[11] 4,096,781

[45] Jun. 27, 1978

[54] PROCESS AND MACHINE FOR PRODUCTION OF BRAIDED PACKING

[76] Inventors: Kurt Bock, Estebogen 49, 2151 Hamburg Cranz; Georg Flohr, Margarethenstr. 25, 2110 Buchholz, both of Germany

[21] Appl. No.: 639,410

[22] Filed: Dec. 10, 1975

Related U.S. Application Data

[62] Division of Ser. No. 503,435, Sep. 5, 1974, abandoned.

[51] Int. Cl.[2] ............................................. D04C 3/08
[52] U.S. Cl. ........................................... 87/28; 87/50
[58] Field of Search .................. 87/5, 6, 7, 8, 28, 29, 87/30, 37, 38, 50, 51

[56] References Cited

U.S. PATENT DOCUMENTS

| | | | |
|---|---|---|---|
| 894,022 | 7/1908 | Lepperhoff | 87/37 |
| 1,885,676 | 11/1932 | Blaisdell | 87/30 X |
| 2,085,334 | 6/1937 | Richards | 87/30 |
| 3,866,512 | 2/1975 | Berger | 87/37 |
| 3,894,470 | 7/1975 | Reichel | 87/37 X |

*Primary Examiner*—John Petrakes
*Attorney, Agent, or Firm*—Miller & Prestia

[57] ABSTRACT

Apparatus and method are disclosed for inserting an additive type thread along a surface area of a braided fabric. Base material containing bobbins are guided about the base material bobbin path, whereas bobbins containing the desired additive thread are only permitted to revolve around a portion of the base material bobbin path corresponding to the fabric surface. The base material containing bobbins and the additive thread containing bobbins are provided with different types of feet; the feet of the base material bobbins cooperating with stationary switch means located along the bobbin path to permit rotation of the base material bobbins about the entire bobbin path. In contrast, the feet of the additive type bobbins cooperate with the same stationary switch means in such manner that rotation of the additive thread containing bobbins is limited to a certain specified portion of the bobbin path; the portion corresponding to the desired fabric surface area.

8 Claims, 5 Drawing Figures

PROCESS AND MACHINE FOR PRODUCTION OF BRAIDED PACKING

This is a division of application Ser No. 503,435, filed Sept. 5, 1974, now abandoned.

This invention relates to a novel packing, especially a rod packing having an additive material to improve the surface gliding and heat resistance characteristics of the packing, and the process and apparatus for its production.

Sometimes different requirements are made of material which comprises the frictional surface of a packing, and the material of the other cross section of the packing. The surface exposed to movement preferably has particularly favorable frictional characteristics which are heat resistant and have great mechanical strength while the remaining packing material is under less stress in this respect but has heat conducting characteristics. However, because of the mechanical strength, one will endeavor to anchor the threads constituting the surface of the packing, in the depth of the cross section of the packing on the basis of the braiding technique selected, which will be realized to a variable degree in the case of the various methods of braiding used for packings, for example plait braiding, concentric or diagonal braiding. It has been known to braid into the base material a small quantity of a particularly valuable additive, for example, graphite or Teflon edging in order to improve the gliding and heat conducting characteristics of a packing. The consolidation with the braiding takes place in such a way that a few bone bobbins are equipped with an additive. In the finished braiding the additive follows the braiding paths determined by the braiding system selected. For example, based on a diagonal braiding it passes through the entire packing cross section. Since the valuable characteristics of the additive material are required only or overwhelmingly on the surface exposed to friction, the equipping of individual bone bobbins with the additive material results in a consumption of the additive material, which is in an unfavorable relationship to the frequency of the appearance of the additive material on the surface exposed to friction.

It had been known to cover only the packing surface exposed to friction with a thin strip of the more valuable material. However, it has been found to be difficult to achieve a sufficiently homogenous connection of the cover strip or layer and the packing.

Therefore the invention is based on the object of improving a braided packing, which in the main consists of a base material and to a small extent of threads of another material, through the fact that the threads of the other material are concentrated in a certain area of the surface and are connected in a secure manner with the base material.

The solution according to the present invention consists in that the threads of the other material are threaded into the braiding of the base material in the surface area of the packing. For example, the additional threads can be braided into, looped around, overcast, crocheted around, or sewn into the basic material. This results in the desired anchoring of the additive material in the depth of the cross section of the packing, whereby it nevertheless will be exclusively in or adjacent to the surface that is to be finished.

In selecting the basic material, its running characteristics just play a subordinate role so that the main emphasis can be placed on its heat conductivity, absorptive capacity, hardness and also on its price. Particularly, wear resistant, easily sliding, heat resistant and mechanically high quality threads can be used as additive material.

Preferably, the threads of the additive material are braided into the base material. That can be accomplished particularly by guiding the bone bobbins of the additive material around the bone bobbins of the base material, whenever the latter pass through the braiding area assigned to the surface that is to be finished. In other words, different bobbin paths are fixed for the bone bobbins of the base material and for the bone bobbins of the other material. While the braider has the customary paths for the bone bobbins of the base material, which result for example in a plait, a diagonal or concentric braiding, special bobbin paths may be provided for the bone bobbins equipped with the other material which merely pass through the surface area to be finished with this material. It would be possible to use paths for this purpose which are completely separate with regard to type from those of the bobbin paths of the base material. However, it is preferable that the bobbin paths of the other material likewise follow the circumferential lines of the impellers, provided for the standard bobbin paths on the side of the surface to be finished, which as a result of their switch arrangement extend only across the surface cross section that is to be finished.

For this purpose bobbin paths, running in parallel to the other bobbin paths can be provided in the area to be finished for the bone bobbins of the additive material. However, it would be possible even in this area to use the same bobbin paths, i.e., guide grooves for the feet of the bobbins, for all bone bobbins and to provide differences only in case of those switches where the bone bobbins of one or the other kind follow different directions. For example, these switches may be under forced control or in connection with a variable development of the bobbin feet, they can have different guide surfaces for the guidance of the one type of bone bobbins in one direction and of the other bone bobbins in the other direction.

The invention will be explained in the following paragraphs in more detail and with reference to the accompanying drawings wherein.

Figure 1:
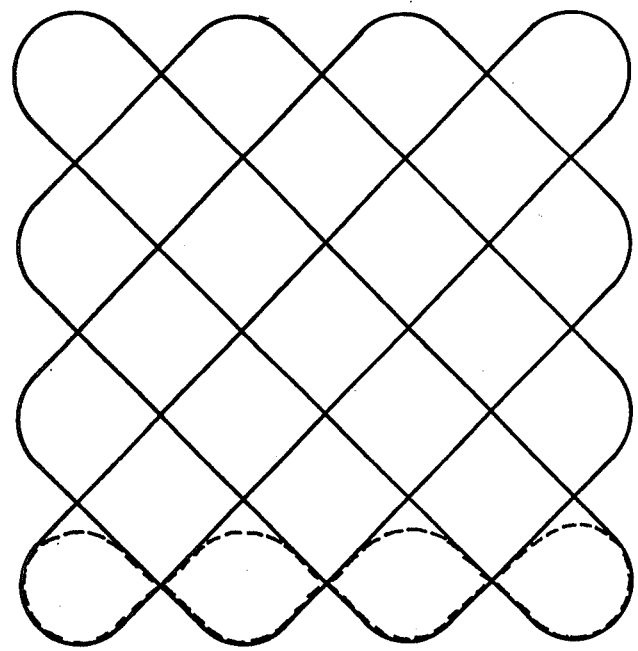
FIG. 1 shows the cross section of a diagonal braiding finished according to the invention.

As seen in the drawings, the solid lines in FIG. 1 indicate the braids of the base material following the standard course of a four-ribbed diagonal braiding. The additional braiding of other material is shown in the drawings as dash-dot lines. The base material constitutes a fixed skeleton of threads, threads reaching the area of one surface are encircled by additional threads. Accordingly, it will be assured on the one hand that the additional threads are safely connected with the base braiding, and on the other hand they will participate to the greatest possible extent in the formation of the pertinent surface, which represents the running surface of the packing. The basic braiding consists of customary material, for example, asbestos threads. The additional threads may consist, for example, of polytetra fluoroethylene or graphite fibers. They may be either strips or monofil threads. Thus, a packing will be created, which, owing to the choice of the base material, is distinguished by having a high degree of elasticity and good heat conductivity, which, owing to the additive material, has excellent erosion and corrosion resistance and is considerably cheaper compared to the packings which are presently on the market. The additionally woven-in braid can have a round, angular or flat shape. To improve the heat flow it can have a metallic or mineral core, or it can be developed in some other way such that it will meet the requirmements occurring in the area of the running surface of the packing in the best way, whereby even an expensive construction need not be feared, because the braid constitutes only a small part of the total volume of the packing.

The use of the braiding according to the present invention can be used in connection with concentric braiding because of a relatively high hose-skeleton. At the same time, the additional braiding is limited to the circumferential area assigned to the running surface of the packing.

As compared to known packings, wherein additional working material is woven through the entire cross section of the packing, about 30 to 50% of the high priced working or raw material will be saved.

The expansion in volume of the rod packing according to the present invention is considerably less in case of use of Teflon threads or Teflon-impregnated fiber substances as additional braiding threads, than in case of a packing, consisting exclusively or overwhelmingly of Teflon threads. Moreover, the framework of the packing advancing to the area of the gliding surface contributes to the emission of heat from here. It has been known that fiber substances from organic base material or mineral base materials have a poor heat conducting capacity. In order to make the braiding skeleton useable at higher temperatures and in order to improve the heat conductivity, metal threads or metal powders can be inserted into the braiding thread by drilling or impregnation. This metallically enriched thread results in a considerably increased useful life and in better heat emission from the gliding surface of the packing. In that case, even under high temperature loads, where graphite threads would otherwise have to be used, Teflon saturated fiber substances can still be used as additional threads, since the temperature load will be smaller because of the improved heat flow from the gliding surface.

Figure 2:
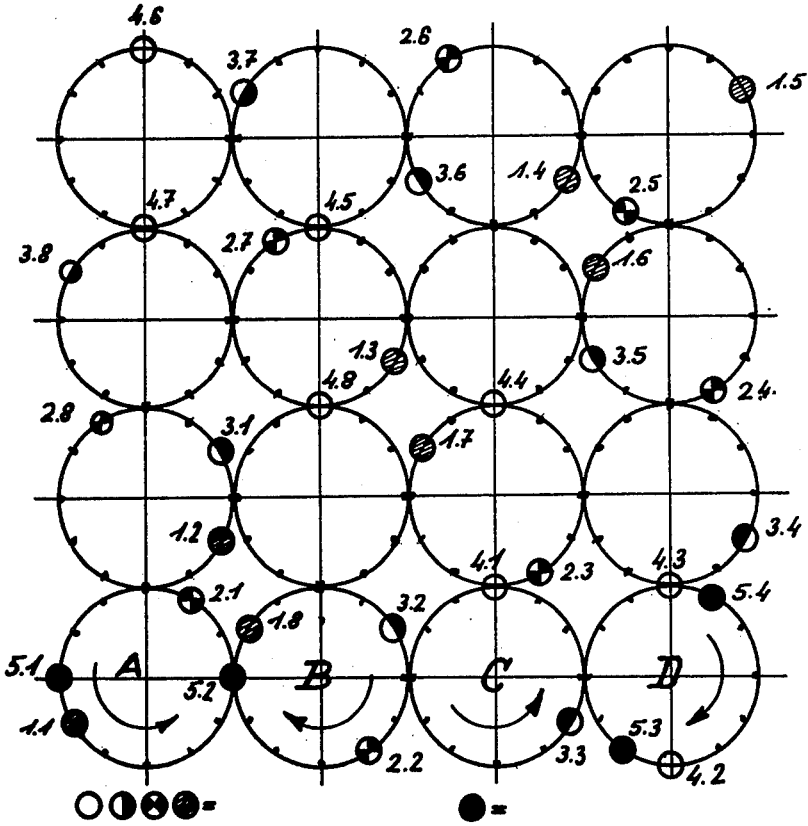
FIG. 2 shows the operating and schematic diagram of a machine suitable for braiding according to the invention.

The diagram of the bobbin paths shown in FIG. 2 corresponds to the course of the braids shown in FIG. 1. It can be seen that the machine, even if it is equipped only with diagonal bone bobbins, will deliver a customary quadruple diagonal braiding. The diagonal bobbins leave a group of four control openings free on the wheels A, B, C, and D, which as shown in FIG. 2 are equipped with additional bone bobbins. If one follows the path of these bone bobbins, then one will find that the thread of the additional bobbin 5.1 crosses with the diagonal bone bobbin 1.1 and thus is interlaced. If one continues to observe the path of the additional bobbin 5.1, then one will find a crossing of the paths with bone bobbin 2.3, and after that with the bone bobbin 4.5 in the area of the wheel D. On the return trip an encirclement with the thread of bobbin 3.4 results. Analogous results happen to the remaining additional bobbins.

The machine arrangement shown permits a maximum of four additional bone bobbins. It is obvious that these machines can also be operated with a smaller number of additional bobbins. Whenever a larger number of additional bobbins are desired then this can be made possible by providing a larger number of driver openings at wheels A to D.

Figure 3:
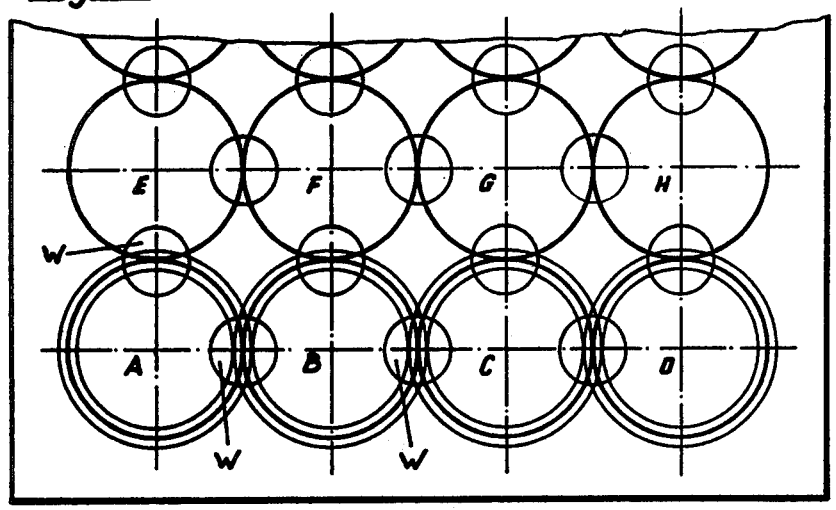
FIG. 3 illustrates the arrangement of the guide grooves in case of a machine according to FIG. 2.

If no forcibly controlled switches are to be provided at the places of transition between the two wheels at which the diagonal bobbins and the additional bobbins are to follow in different paths, it would entail considerable expenditure, then different guide grooves can be arranged in the base plate for the bone bobbins of one and of the other kind, as shown in FIG. 3. Assuming that in the range of the wheels, wheels E to H as indicated, which are circled exclusively by diagonal bobbins, there is always only one guide groove provided in a known manner, which also continues tangentially in the area of the wheels A to D. Beyond that, however, another pair of additional guide grooves are indicated in the area of the wheels A to D, which grooves are intended for the additional bobbins. While the feet of the diagonal bobbins are equipped with the customary guide pegs running in the middle grooves, the feet of the additional bobbins do not have a peg at this place, but instead they have a pair of pegs laterally thereof, which cooperate with the outside guide grooves. Thus, different paths can be made available for the various bone bobbins.

Figure 4:
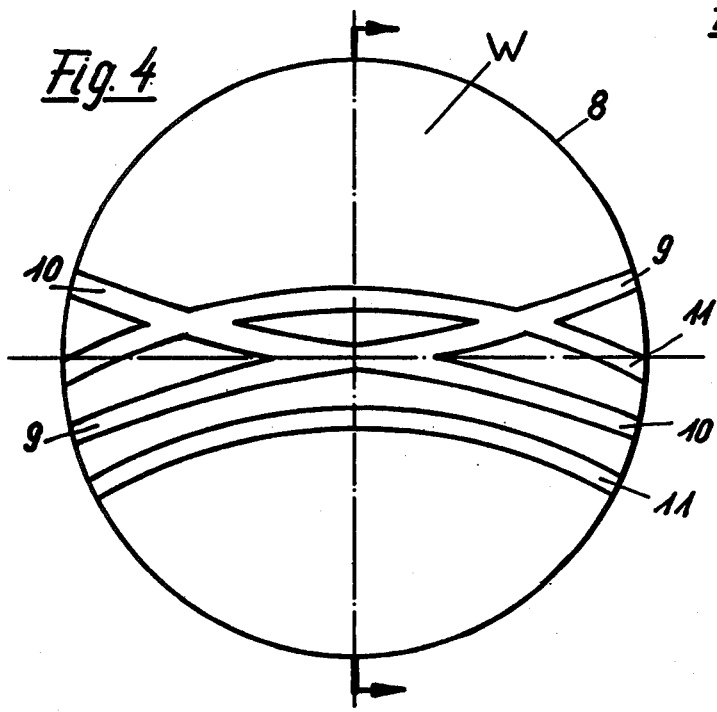
FIGS. 4 and 5 are a top view and a sectional view of the piece of a switch to be used in the case of the machine according to FIG. 3.

In FIG. 3 as illustrated by circles W in the contact area of adjacent wheels, the switch elements are exchangeable in a known manner and are to be located at these places. The switch elements between wheels encircled exclusively by diagonal bobbins have a conventional structure. The switch elements between the wheels which are encircled by both diagonal bobbins and the additional bobbins always have the customary guide grooves for the diagonal bobbins and parallel thereto on both sides a groove for the additional bobbins. The switch elements between one wheel which is encircled by additional bobbins and other wheel which is encircled exclusively by diagonal bobbins, has the shape shown in FIG. 4 at a larger scale. These switch elements W resemble by contour or outline 8, the remaining switch elements. They also agree with them insofar as they have two grooves 9 and 10, crossing in the middle for guiding the diagonal bobbins, which are to be conducted by the switch element from one wheel to the adjacent one. However, they also have a pair of grooves 11, which run concentrically to that wheel which is to be encircled by the additional bobbins. Assuming that the switch element shown in FIG. 4 is the one which is located between the wheels A and E according to FIG. 3, then the groove 9 constitutes the guide for the bone bobbins of the series 1, the groove 10 constitutes the guide for the bobbins of the series 2 and grooves 11 guide the additional bobbins of the series 5. While the diagonal bobbins are transferred by the grooves 9 and 10 from the wheel E to wheel A, the additional bobbins are held by the grooves 11 in the area of wheel A.

Figure 5:
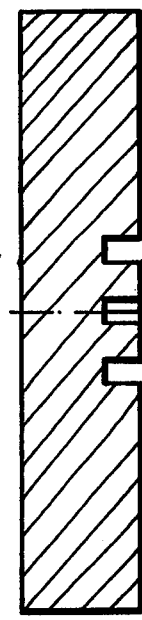

FIG. 5 shows a cut through a switch element according to FIG. 4 along the line of intersection indicated in FIG. 4.

The switch elements W between the wheels, which are encircled both by diagonal as well as by additional bobbins only differ from the switch element illustrated in FIG. 4 by having two pairs of grooves 11, one pair of which runs diagonally and parallel to groove 9, and the other pair runs parallel to groove 10, in such a way that the additional bobbins are transferred from the area of one wheel to that of another wheel.

What is claimed is:

1. In a braiding process of the type adapted to insert an additive thread along a fabric surface and including revolution of a plurality of base material containing bobbins about a base material bobbin path, the improvement comprising:
    (a) guiding at least one bobbin containing additive thread around said base material bobbins whenever the latter pass through a portion of said base material bobbin path corresponding to said fabric surface; and
    (b) providing stationary switch means along said base material bobbin path portion so that said additive material bobbins revolve exclusively about said portion, while said base material bobbins revolve about the entire base material bobbin path.

2. An improved process as recited in claim 1 further comprising providing additive material bobbin paths along said portion of said base material path and parallel to said base material bobbin path.

3. In a braiding apparatus of the type including a bobbin path, base material containing bobbins, and means for rotating said bobbins about said bobbin path to form a braided fabric, the improvement comprising:
    (a) additive yarn containing bobbins disposed in said bobbin path;
    (b) means for driving said additive yarn containing bobbins along said bobbin path; and
    (c) stationary switch means disposed along said path for limiting movement of said additive yarn containing bobbins to a certain bobbin path portion so that said additive yarn extends only along a certain fabric surface.

4. Apparatus as recited in claim 3 wherein said additive yarn is polytetrafluoroethylene.

5. Apparatus as recited in claim 3 wherein said additive yarn is graphite.

6. Apparatus as recited in claim 3 wherein said base material is asbestos.

7. In a braiding apparatus of the type including a first bobbin path, base material containing bobbins, and means for rotating said bobbins about said first bobbin path to form a braided fabric, the improvement comprising:
    (a) an additive material bobbin path located along a first bobbin path portion, said additive material bobbin path being parallel to said first bobbin path along said portion;
    (b) at least one additive yarn containing bobbin disposed in said additive material bobbin path;
    (c) means for driving said additive yarn containing bobbin along said additive material bobbin path; and
    (d) stationary switch means disposed along said first bobbin path and connected to said additive yarn bobbin path for limiting movement of said additive yarn containing bobbin to said additive yarn bobbin path so that said additive yarn extends only along a certain fabric surface.

8. Apparatus as recited in claim 7 wherein said switch means includes two intersecting channels for guiding the base material bobbins, and a pair of parallel channels to guide the additive yarn containing bobbins.

* * * * *